United States Patent
Bai et al.

(10) Patent No.: US 10,840,637 B2
(45) Date of Patent: Nov. 17, 2020

(54) DOCKING STATION WITH CONNECTORS FOR TABLET AND SMART COVER

(71) Applicants: Yun Bai, Taipei (TW); Ming-Chung Liu, Taipei (TW); Yu-Ning Chang, Taipei (TW); Hong-Tien Wang, Taipei (TW); Shih-Chin Chou, Taipei (TW)

(72) Inventors: Yun Bai, Taipei (TW); Ming-Chung Liu, Taipei (TW); Yu-Ning Chang, Taipei (TW); Hong-Tien Wang, Taipei (TW); Shih-Chin Chou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 10 days.

(21) Appl. No.: 16/280,048

(22) Filed: Feb. 20, 2019

(65) Prior Publication Data

US 2019/0334282 A1 Oct. 31, 2019

(30) Foreign Application Priority Data

Apr. 27, 2018 (TW) .............................. 107114596 A

(51) Int. Cl.
*H01R 13/62* (2006.01)
*G06F 1/16* (2006.01)
(Continued)

(52) U.S. Cl.
CPC ....... *H01R 13/6205* (2013.01); *G06F 1/1654* (2013.01); *G06F 1/1681* (2013.01);
(Continued)

(58) Field of Classification Search
CPC .... H01R 13/6205; H01R 11/30; H01R 13/24; H01R 13/64; H01R 13/627; H01R 43/26;
(Continued)

(56) References Cited

U.S. PATENT DOCUMENTS

| 6,231,371 B1* | 5/2001 | Helot | G06F 1/1632 |
| | | | 361/679.41 |
| 7,103,698 B2* | 9/2006 | Zhang | G06F 1/1632 |
| | | | 361/679.3 |

(Continued)

FOREIGN PATENT DOCUMENTS

TW I563364 12/2016

OTHER PUBLICATIONS

"Office Action of Taiwan Counterpart Application," dated Oct. 29, 2019, p. 1-p. 11.

*Primary Examiner* — Abdullah A Riyami
*Assistant Examiner* — Justin M Kratt
(74) *Attorney, Agent, or Firm* — JCIPRNET

(57) ABSTRACT

An electronic assembly including a first device, a second device, a third device, and a triggering member is provided. The first device has at least one first positioning member, at least one first electrical connector, and at least one second electrical connector. The second device has at least one second positioning member and at least one third electrical connector. The third device has at least one fourth electrical connector. The triggering member is disposed in the third device. The triggering member has a driven portion and a locking portion opposite to each other. In a first state, the first device is detachably assembled and electrically connected to the second device. In a second state, the first device is detachably assembled and electrically connected to the second device, and the first device is also detachably assembled and electrically connected to the third device.

21 Claims, 13 Drawing Sheets

(51) Int. Cl.

| | |
|---|---|
| H01R 12/91 | (2011.01) |
| H01R 13/20 | (2006.01) |
| H01R 13/24 | (2006.01) |
| H01R 4/48 | (2006.01) |
| H01R 13/64 | (2006.01) |
| H01R 13/627 | (2006.01) |
| H01R 11/30 | (2006.01) |
| H01R 43/26 | (2006.01) |

(52) U.S. Cl.
CPC .......... *G06F 1/1632* (2013.01); *G06F 1/1669* (2013.01); *G06F 1/1679* (2013.01); *H01R 4/48* (2013.01); *H01R 11/30* (2013.01); *H01R 12/91* (2013.01); *H01R 13/20* (2013.01); *H01R 13/24* (2013.01); *H01R 13/2407* (2013.01); *H01R 13/62* (2013.01); *H01R 13/627* (2013.01); *H01R 13/64* (2013.01); *H01R 43/26* (2013.01)

(58) Field of Classification Search
CPC ...... H01R 13/2407; H01R 13/62; H01R 4/48; H01R 12/91; H01R 13/20; G06F 1/1632; G06F 1/1669; G06F 1/1679
USPC ................ 439/39, 40, 681, 372; 361/679.41, 361/679.43
See application file for complete search history.

(56) References Cited

U.S. PATENT DOCUMENTS

| | | | |
|---|---|---|---|
| 7,381,095 B2 * | 6/2008 | Freeman | ............... G06F 1/1632 361/679.41 |
| 2010/0265652 A1 | 10/2010 | Agata et al. | |
| 2018/0136697 A1 | 5/2018 | Lee | |

* cited by examiner

DOCKING STATION WITH CONNECTORS FOR TABLET AND SMART COVER

CROSS-REFERENCE TO RELATED APPLICATION

This application claims the priority benefit of Taiwan application serial no. 107114596, filed on Apr. 27, 2018. The entirety of the above-mentioned patent application is hereby incorporated by reference herein and made a part of this specification.

BACKGROUND

Technical Field

The invention relates to an electronic assembly.

Description of Related Art

With the advancement of technology, types of the portable electronic devices (such as smart phones, tablet PCs, etc.) gradually diversify. Comparing to conventional desktop PCs or notebook computers (NBs), the tablet PCs are lighter in weight and smaller in volume.

But unlike the notebook computers nor the desktop PCs, general tablet PCs do not have keyboards. Hence, a variety types of external keyboards are available in the market for the tablet PCs. Nevertheless, when a user tries to use a tablet PC together with a keyboard on an unstable base or on a base with a small supporting area (e.g., the thigh of the user), the keyboard may not operate smoothly owing to unstable support, and the screen of the tablet PC may thus shake or wobbled when the user types on the keyboard. Moreover, the tablet PCs feature portability, but such advantage imposes a limitation on the performance of the tablet PCs.

Therefore, how an addition device for tablet PCs can be provided to enable the tablet PCs to be operated more conveniently and at the same time to deliver favorable performance is an important issue in this field.

SUMMARY

The invention provides an electronic assembly capable of allowing a user to operate more conveniently and delivering favorable device performance through different combination forms of three devices.

In an embodiment of the invention, an electronic assembly includes a first device, a second device, a third device, and a first triggering member. The first device has at least one first positioning member, at least one first electrical connector, and at least one second electrical connector. The second device has at least one second positioning member and at least one third electrical connector. The third device has at least one fourth electrical connector. The first triggering member is disposed in the third device, and the first trigger member has a driven portion and a locking portion being opposite to each other. In a first state, the first device is detachably assembled to and electrically connected to the second device. The at least one first positioning member and the at least one second positioning member are matched with each other, the at least one first electrical connector and the at least one third electrical connector are butted to each other. In a second state, the first device is detachably assembled and electrically connected to the second device, and the first device is also detachably assembled and electrically connected to the third device. The at least one first positioning member and the at least one second positioning member are matched with each other, and the at least one first electrical connector and the at least one third electrical connector are butted to each other. The at least one second electrical connector and the at least one fourth electrical connector are butted to each other. The first device is correspondingly propped against and drives the driven portion submerge into the third device, so as to drive the locking portion to protrude out of the third device and to be locked to a securing portion of the first device.

To sum up, in the electronic assembly provided by the embodiments of the invention, the first device, the second device, and the third device can be matched by the user to form the electronic assembly in different states. The first device is individually connected to the second device and the third device. Since the devices can be combined with each other through the different but corresponding structures of the positioning members and triggering members, the electronic assembly can be accordingly adjusted as required by the user. A stable operation state is thereby provided to the user, and a favorable processing performance is also accordingly delivered.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
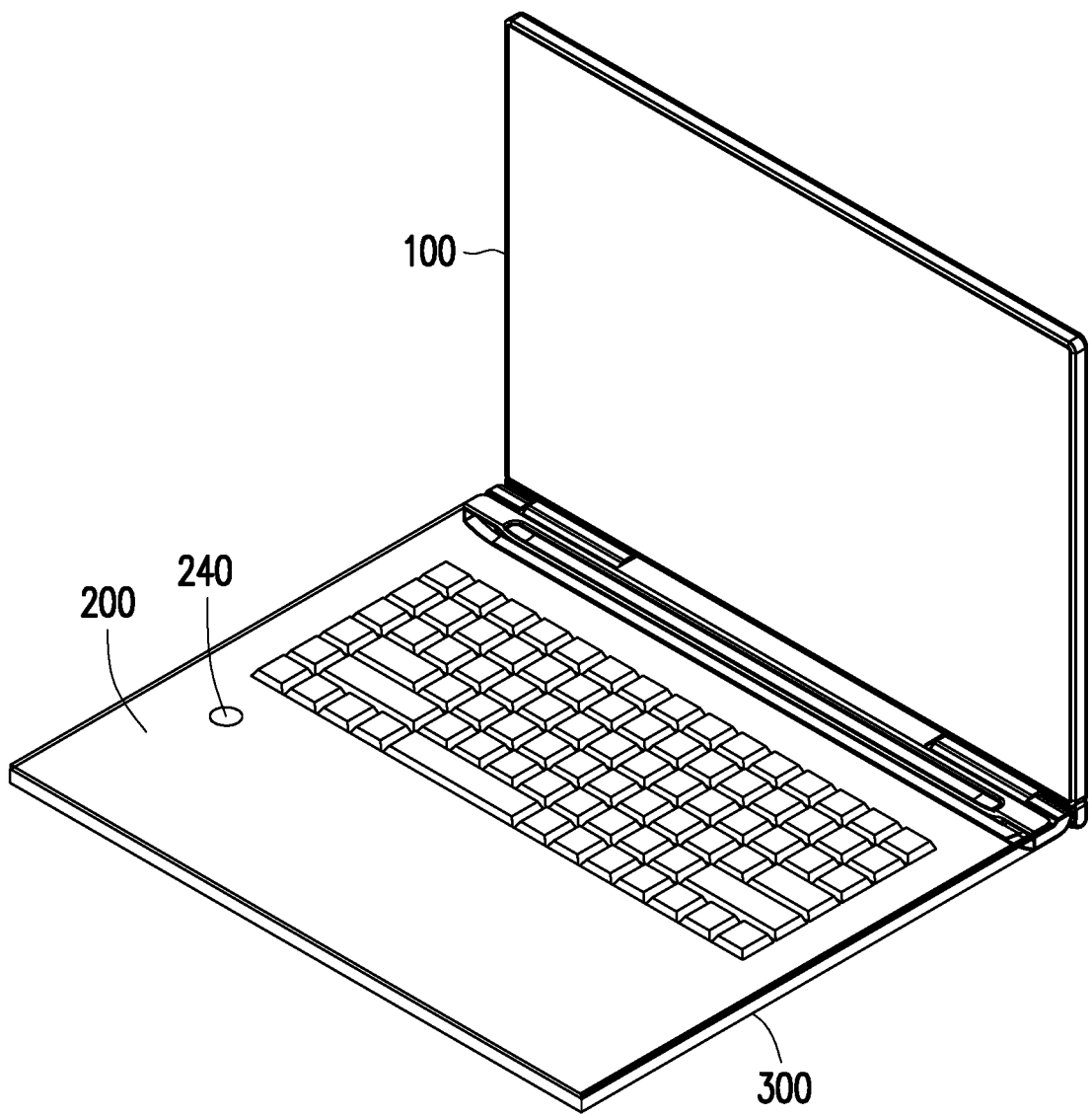
FIG. 1 is a schematic view of an electronic assembly according to an embodiment of the invention.
Figure 2:
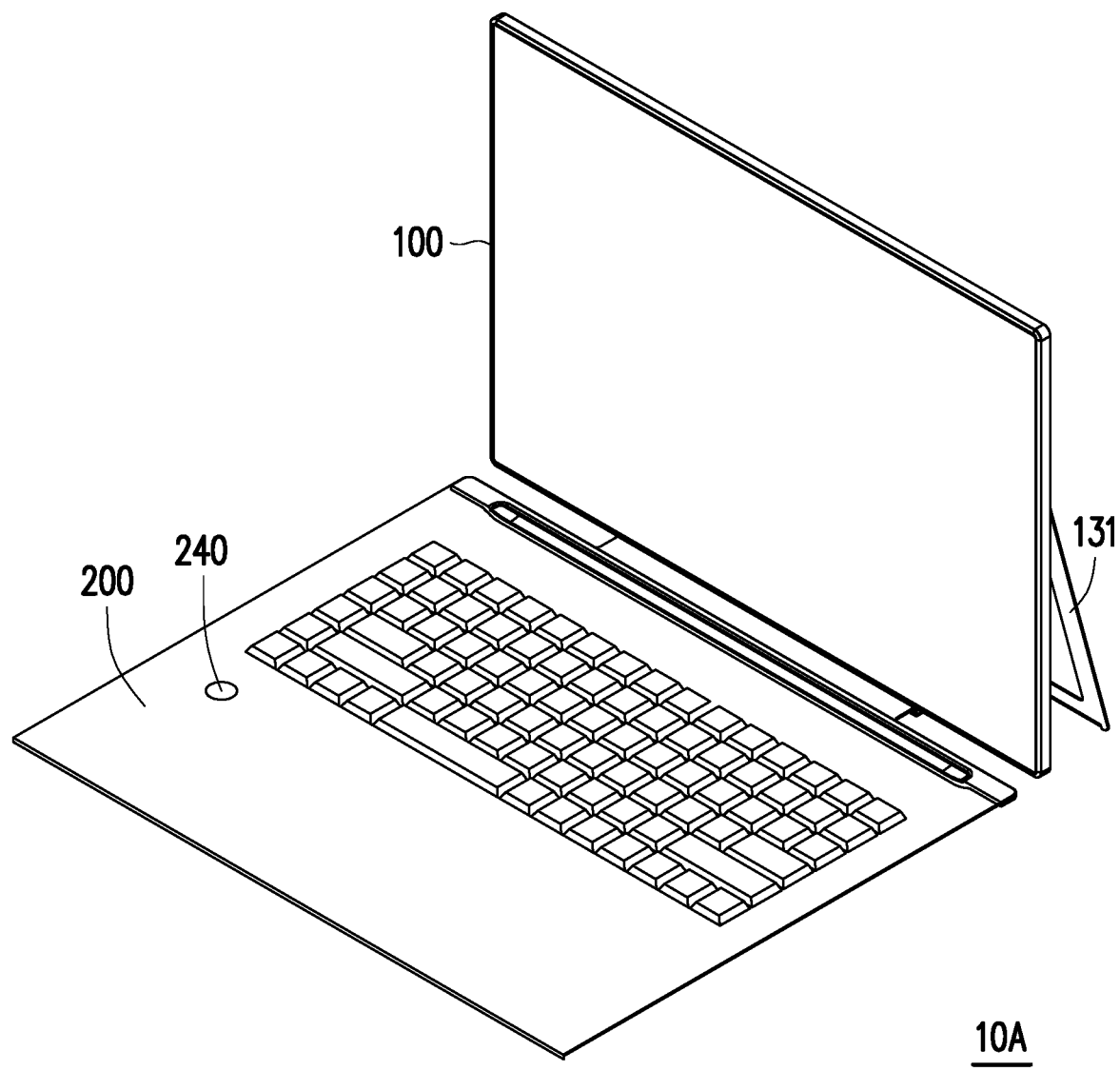
FIG. 2 is a schematic view of an electronic assembly according to another embodiment of the invention.
Figure 3A:
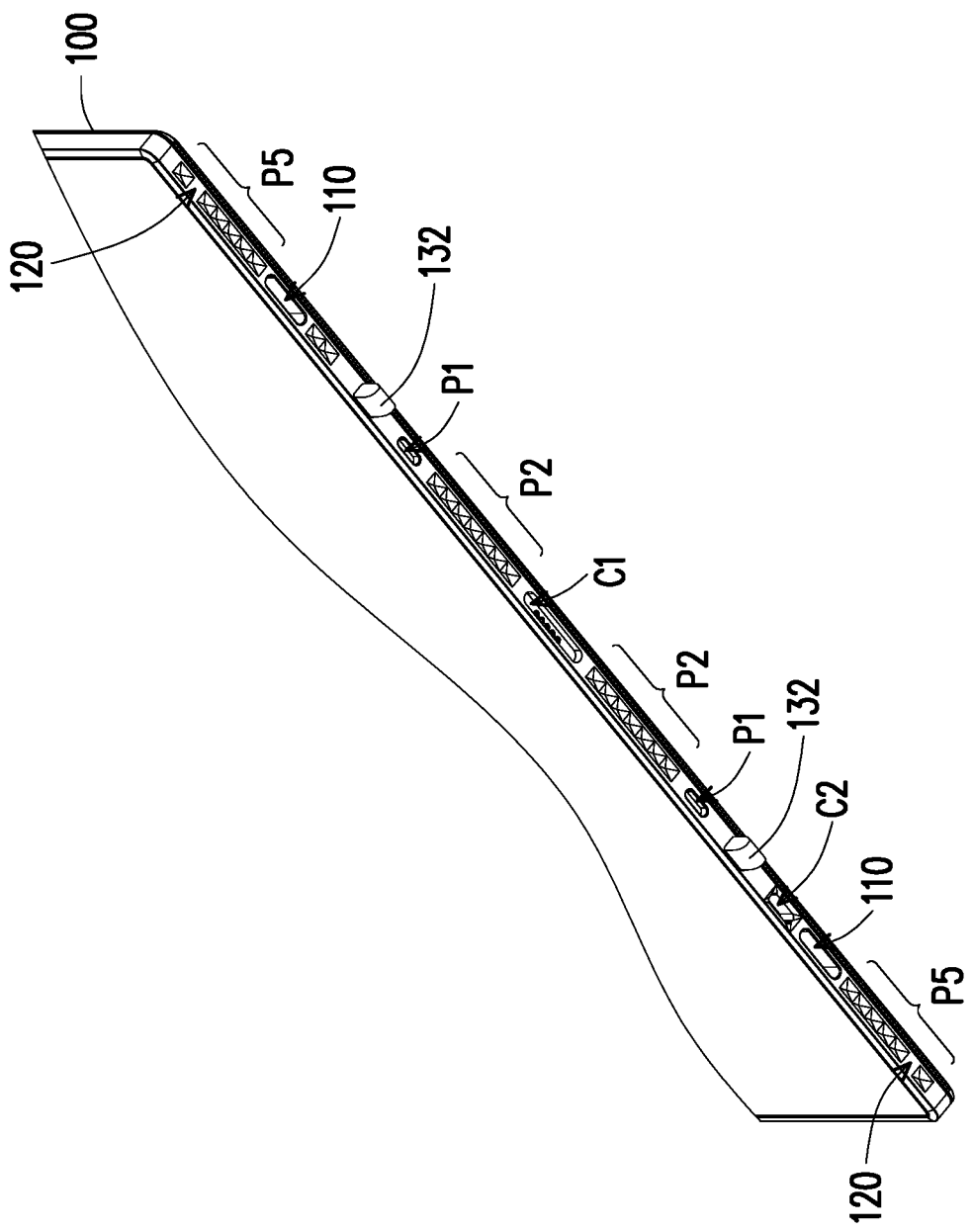
FIG. 3A to FIG. 3C are local schematic views illustrating components of the electronic assembly.
Figure 3B:
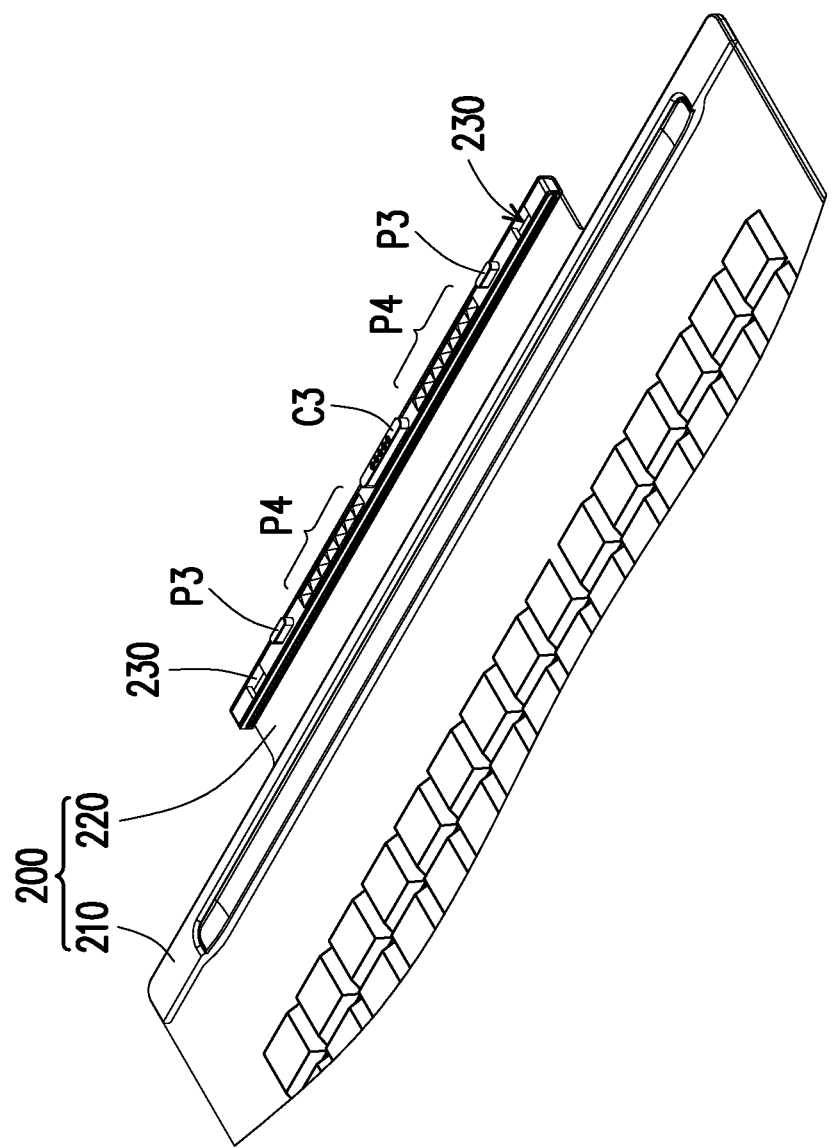
Figure 3C:
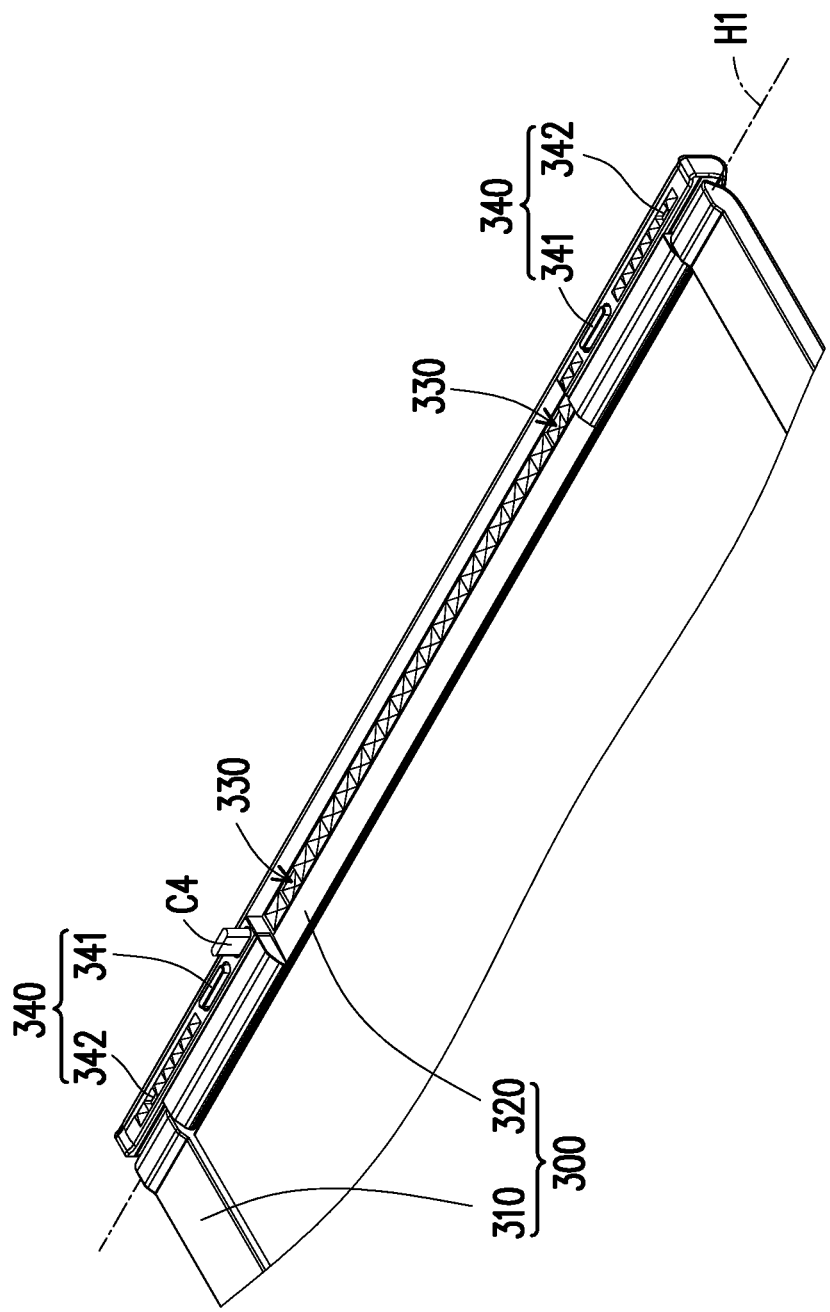

FIG. 1 is a schematic view of an electronic assembly according to an embodiment of the invention. FIG. 2 is a schematic view of an electronic assembly according to another embodiment of the invention. FIG. 3A to FIG. 3C are local schematic views illustrating components of the electronic assembly. With reference to FIG. 1 to FIG. 3C, in this embodiment, an electronic assembly 10 shown in FIG. 1 includes a first device 100, a second device 200, and a third device 300. Among them, the first device 100 is a tablet PC, the second device 200 is a smart cover having an input module, and the third device 300 is a docking station. Further, although the tablet PC features portability as described above, keyboard operation is less stable, and the tablet PC may deliver less favorable performance. Accordingly, in this embodiment, the second device 200 and the third device 300 are enabled to be matched with the tablet PC (the first device 100), so as to effectively enhance stability of keyboard operation and to further enhance performance of the tablet PC.

For instance, when the first device 100 and the second device 200 are combined (structurally connected and electrically connected) to form an electronic assembly 10A, and such state is defined as a first state herein, the first device 100 can provide a user with a convenient input environment through the input module of the second device 200. Moreover, when the electronic assembly 10A is placed on a platform (not shown), a stand 131 of the first device 100 can be further unfolded, so that the electronic assembly 10A is provided with a stable operating environment.

In addition, when the first device 100, the second device 200, and the third device 300 are combined with each other (structurally connected or electrically connected) to form the electronic assembly 10, and such state is defined as a second state herein, the electronic assembly 10A in the first state is further combined with the third device 300 and is supported on the third device 300. Accordingly, the first device 100 achieves the foregoing advantage of being matched with the second device 200 and is further connected to the third device 300, and in this way, additional functions are provided by the third device 300. For instance, the structural supporting effect is not only provided by the third device 300, a graphics processing unit (GPU) can also be disposed in the third device 300, such that a favorable graphic display effect is provided to the first device 100. Certainly, in other embodiments that are not shown, electronic modules of different functions may be further provided by the third device 300, so that applications of the electronic assembly 10 are expanded.

Based on the above, the first device 100 can be matched with the second device 200 or the third device 300 to form a structural or electrical connection relationship, such that the electronic assembly 10 or the electronic assembly 10A being formed may be suitably applied to the environment.

A connection structure of each of the devices and the structural and electrical connection relationships among the devices are further described as follows.

Figure 4:
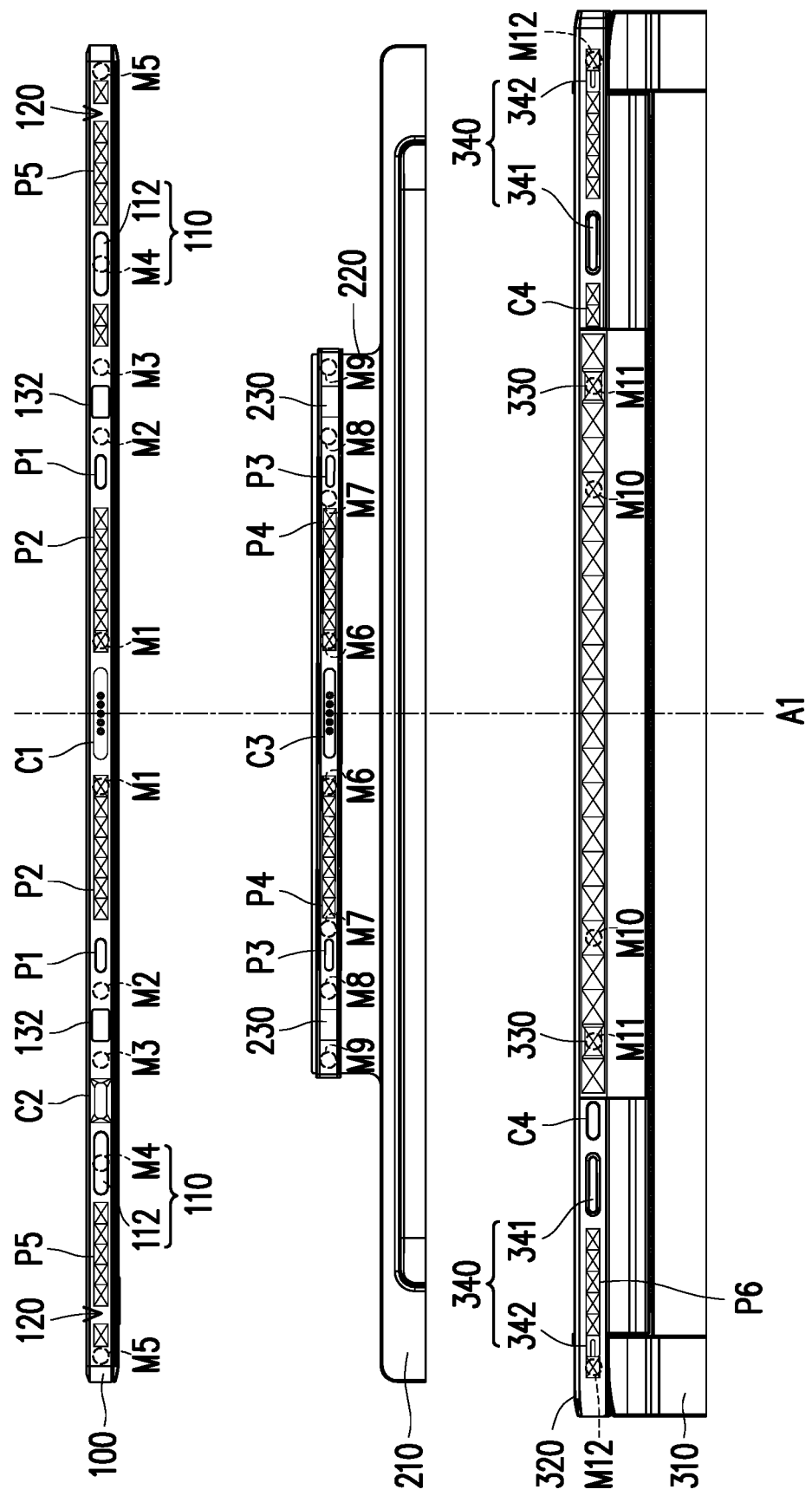
FIG. 4 is a schematic view illustrating a corresponding relationship of the components.

FIG. 4 is a schematic view illustrating a corresponding relationship of the components. With reference to FIG. 3A to FIG. 3B and FIG. 4 together, in this embodiment, the first device 100 has least one first positioning member, at least one first magnetic member, at least one first electrical connector, and at least one second electrical connector. Further, first positioning members P1, first magnetic members M1, first magnetic members M2, first magnetic members M3, a first electrical connector C1, and a second electrical connector C2 are illustrated in the embodiment shown in FIG. 4. Among them, the first electrical connector C1 is, for example, a pogo pin, and the second electrical connector C2 is, for example a type C connector.

Further, the second device 200 has at least one second positioning member, at least one second magnetic member, and at least one third electrical connector. Further, second positioning members P3, second magnetic members M6, second magnetic members M8, second magnetic members M9, and a third electrical connector C3 are illustrated in the embodiment shown in FIG. 4. Among them, the third electrical connector C3 is, for example, a pogo pin. The third device 300 has at least one fourth electrical connector, and further, fourth electrical connectors C4 illustrated in the embodiment shown in FIG. 4 are type C connectors.

As shown in FIG. 4, note that the first device 100, the second device 200, and the third device 300 share a same central axis A1 in the first state and the second state after being combined. Except for the electrical connectors, the magnetic members and the positioning members are symmetrically disposed approximately based on the central axis A1. Nevertheless, the embodiment is not limited thereto. In the embodiments that are not shown, the positioning members, the magnetic members, and the electrical connectors may be disposed on at least one side of the central axis A1.

As described above, in the first state, the first device 100 and the second device 200 may be detachably assembled to each other to form the electronic assembly 10A as shown in FIG. 2. At the time being, the first positioning members P1 and the second positioning members P3 are matched with each other, the first magnetic members M1, M2, and M3 and the second magnetic members M6, M8, and M9 magnetically attract each other correspondingly, and the first electrical connector C1 and the third electrical connector C3 are butted to each other. In this case, the input module of the second device 200 and a processor (not shown) of the first device 100 are electrically connected. Note that the first positioning members P1 and the second positioning members P3 respectively feature a concave structure and a convex structure matched with each other for providing structural positioning and combining effects.

Further, the first device 100 further includes first positioning members P2, and the second device 200 further includes second positioning members P4. Moreover, the first positioning members P2 and the second positioning members P4 respectively feature a concave structure and a convex structure matched with each other for providing the structural positioning and combining effects as well. A difference therebetween is that matching degrees of the concave structures and the convex structures are different. The different matching degrees refer to different structural properties of the concave structures and the convex structures, such as a difference in depth (height) or a difference in inner diameter (outer diameter). For instance, the structure of the first positioning members P1 and the structure of the second positioning members P3 respectively feature a longer protruding length and a deeper recessed depth, but the structure of the first positioning members P2 and structure of the second positioning members P4 are not.

Figure 5A:
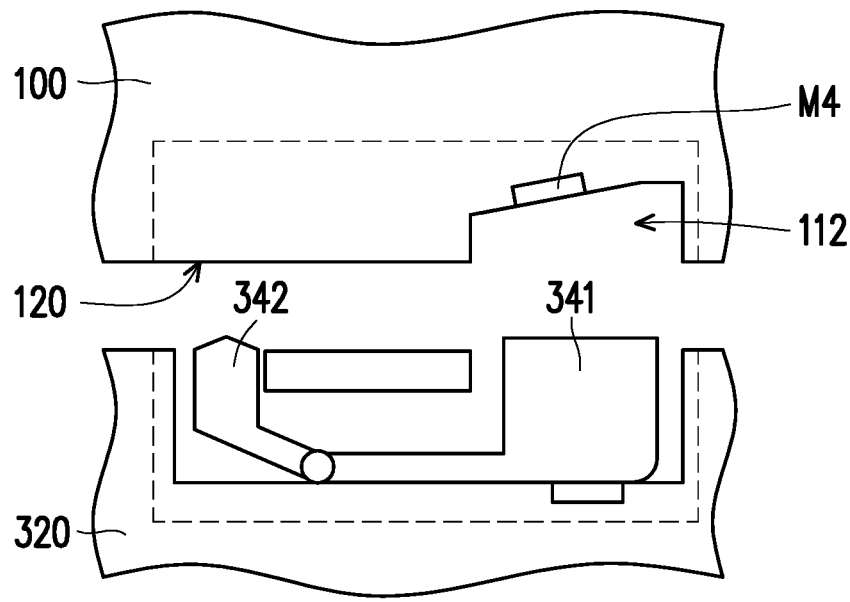
FIG. 5A and FIG. 5B are local schematic views illustrating the first device and the third device.
Figure 5B:
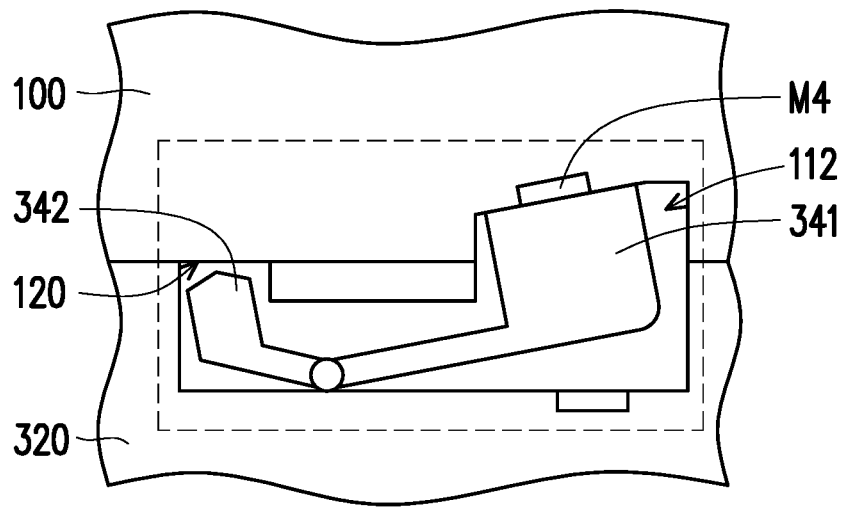

FIG. 5A and FIG. 5B are local schematic views illustrating the first device and the third device. With reference to FIG. 4, FIG. 5A and FIG. 5B, the electronic assembly 10 of this embodiment further includes first triggering members 340 pivoted into the third device 300. Each of the first triggering members 340 has a driven portion 342 and a locking portion 341 opposite to each other, and only the driven portion 342 or only the locking portion 341 protrudes out of the third device 300 at a time. That is, the first triggering members 340 may be regarded as a seesaw structure disposed in the third device 300 to generate a switching effect. As shown in FIG. 3C, only the locking portions 341 protrude out of the third device 300.

In the second state, the first device 100 is detachably assembled and electrically connected to the second device 200, and the first device 100 is also detachably assembled and electrically connected to the third device 300. In addition to the connection relationship between the first device 100 and the second device 200, the second electrical connector C2 and one of the fourth electrical connectors C4 are butted to each other as well. The first device 100 is correspondingly propped against and drives the driven portions 342 submerge into the third device 300 so as to drive the locking portions 341 to protrude out of the third device 300 and to be locked to securing portions 110 of the first device 100. In this embodiment, each of the securing portions 110 includes a first depression 112 and a third magnetic member M4 located in the first depression 112, and each of the locking portions 341 is a magnetic member or includes a magnetic member. As such, in the second state, the locking portions 341 are locked to the first depressions 112 and magnetically attract the third magnetic members M4. In other words, the first device 100 and third device 300 are structurally combined with and secured to each other through the first triggering members 340 and the securing portions 110.

Moreover, the first device 100 further includes fourth positioning members P5, and the third device 300 further includes third positioning members P6. Similar to the first positioning members P2 and the second positioning members P4, the fourth positioning members P5 and the third positioning members P6 also feature a concave structure and a convex structure matched with each other, so as to simultaneously provide supporting positioning and combining effects when the first triggering members 340 and the securing portions 110 are locked. Further, as shown in FIG. 4, the first triggering members 340 are substantially embedded below the third positioning members P6. Each of the driven portions 342 is located at one of positions between the third positioning members P6, or each of the driven portions 342 is one of the third positioning members P6, so as to accordingly provide an appearance of a hidden structure for the third device 300. Correspondingly, the driven portions 342 are pressed by triggering planes 120 of the first device 100 to submerge into the third device 300, and each of the triggering planes 120 is located at one of the positions between the fourth positioning members P5.

In addition, the second device 200 further includes fourth magnetic members M7, and the third device 300 further includes fifth magnetic members M10 as shown in FIG. 4. In the second state, the fourth magnetic members M7 magnetically attract the fifth magnetic members M10. Further, the first device 100 further includes fifth magnetic members M5, and the third device 300 further includes fifth magnetic members M11 and fifth magnetic members M12. In the second state, the fifth magnetic members M12 magnetically attract the first magnetic members M5, the fifth magnetic members M11 magnetically attract the second magnetic members M8, and as described above, the second magnetic members M8 magnetically attract the first magnetic members M2 simultaneously.

With reference to FIG. 1, FIG. 3A to FIG. 3C, and FIG. 4 again, the input module (e.g., a keyboard as shown in the figures) of the second device 200 is disposed on a flexible material to be manufactured and to form a cover of the first device 100 after being connected to the first device 100. The second device 200 includes a body 210 and a protruding portion 220. Moreover, the second positioning members P3, the second magnetic members M6, M8, and M9, and the third electrical connector C3 are located on the protruding portion 220. In the second state, the protruding portion 220 is sandwiched between the first device 100 and the third device 300, and the second electrical connector C2, the fourth electrical connectors C4, the first triggering members 340, and the securing portions 110 are located outside the protruding portion 220. In other words, since an orthogonal projection contour of the protruding portion 220 on the third device 300 does not overlap the second electrical connector C2, the fourth electrical connectors C4, the first triggering members 340, the securing portions 110, etc., it means that the second device 200 and the third device 300 are individually connected to the first device 100.

FIG. 6A to FIG. 6D are local cross-sectional views illustrating the first device in different states. With reference to FIG. 6A to FIG. 6D and FIG. 2, the first device 100 further includes the stand 131 and second triggering members 132 in this embodiment. The stand 131 is pivoted to a machine body of the first device 100 to pivot and to open and close relative to the machine body. The second triggering members 132 are movably disposed at the machine body to protrude from or submerge into the machine body. Moreover, the second triggering members 132 are connected to the stand 131, so as to drive the stand 131 to pivot and to open relative to the machine body when the second trigger members 132 submerges into the machine body. As such, the electronic assembly 10A shown in FIG. 2 is presented (the first state).

As shown in FIG. 3A, the second triggering members 132, the first positioning members P1, the first electrical connector C1, and the second electrical connector C2 are together located on a bottom surface of the machine body. Moreover, the second device 200 further includes flexible pads 230. As shown in FIG. 3B and FIG. 6A to FIG. 6D, the flexible pad 230 covers an external surface of the second triggering member 132 in the first state. To achieve the first state shown in FIG. 2, an external force is adapted to be applied to the flexible pad 230. For instance, a user holds and presses the first device 100 towards a platform 400 to drive the second triggering members 132 submerge into the machine body of the first device 100 (i.e., the process of converting from FIG. 6B to FIG. 6C), so as to accordingly drive the stand 131 to open to support the first device 100 through the second triggering members 132.

Note that since the second device 200 has the flexible material, even in the second state, that is, when a moving portion 320 of the third device 300 can rotate relative to a base 310 about a pivot axis H1 (shown in FIG. 3C), the moving portion 320 can also drive the first device 100 and the protruding portion 220 to pivot together relative to the body 210.

Figure 6A:
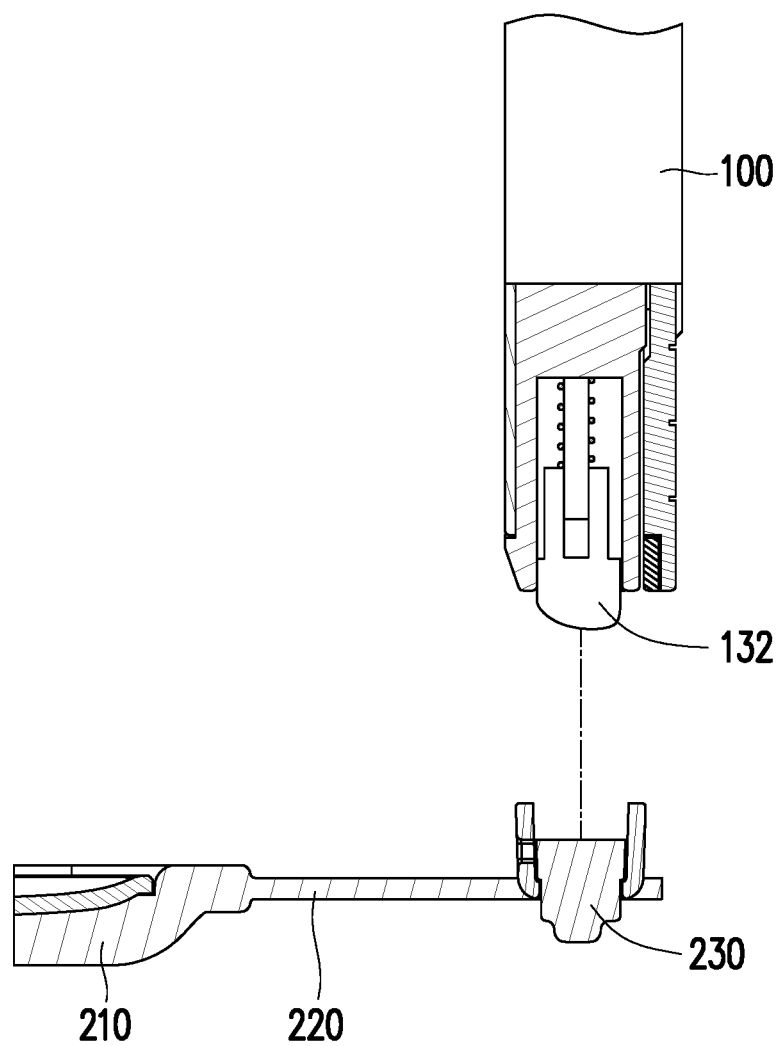
FIG. 6A to FIG. 6D are local cross-sectional views illustrating the first device in different states.
Figure 6B:
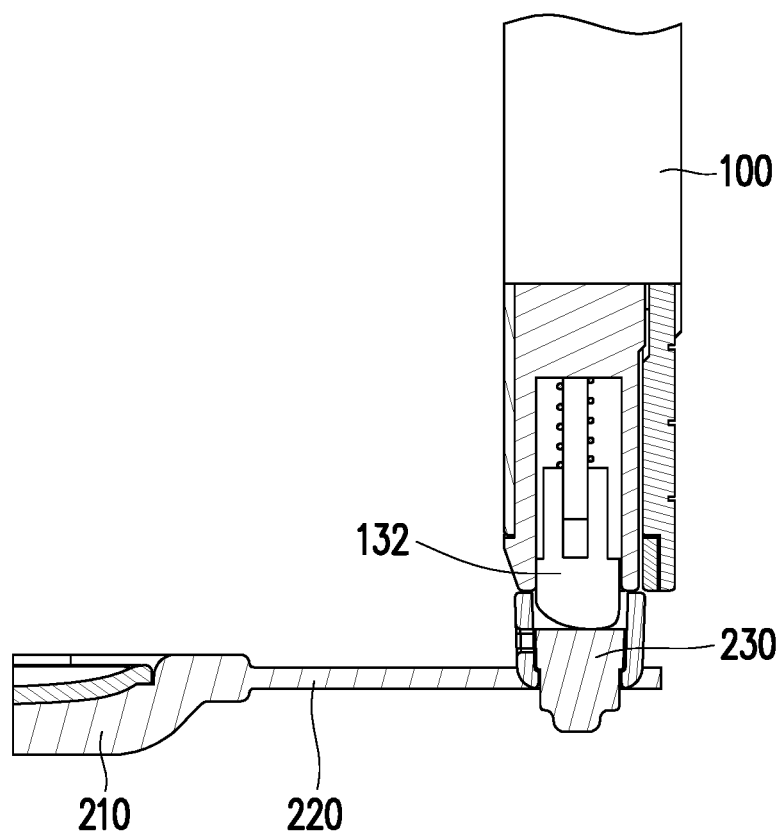
Figure 6C:
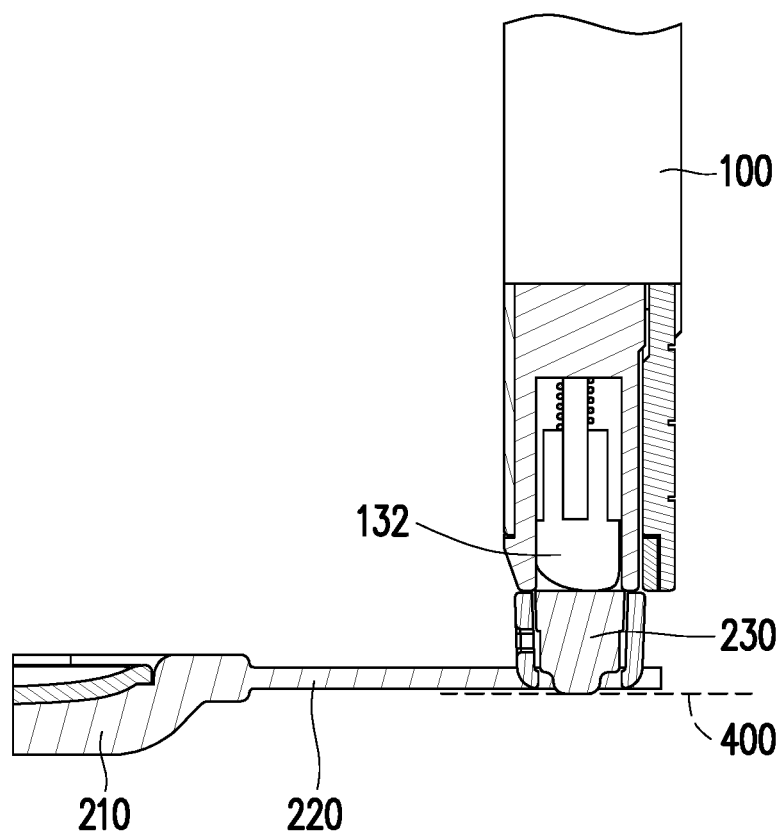
Figure 6D:
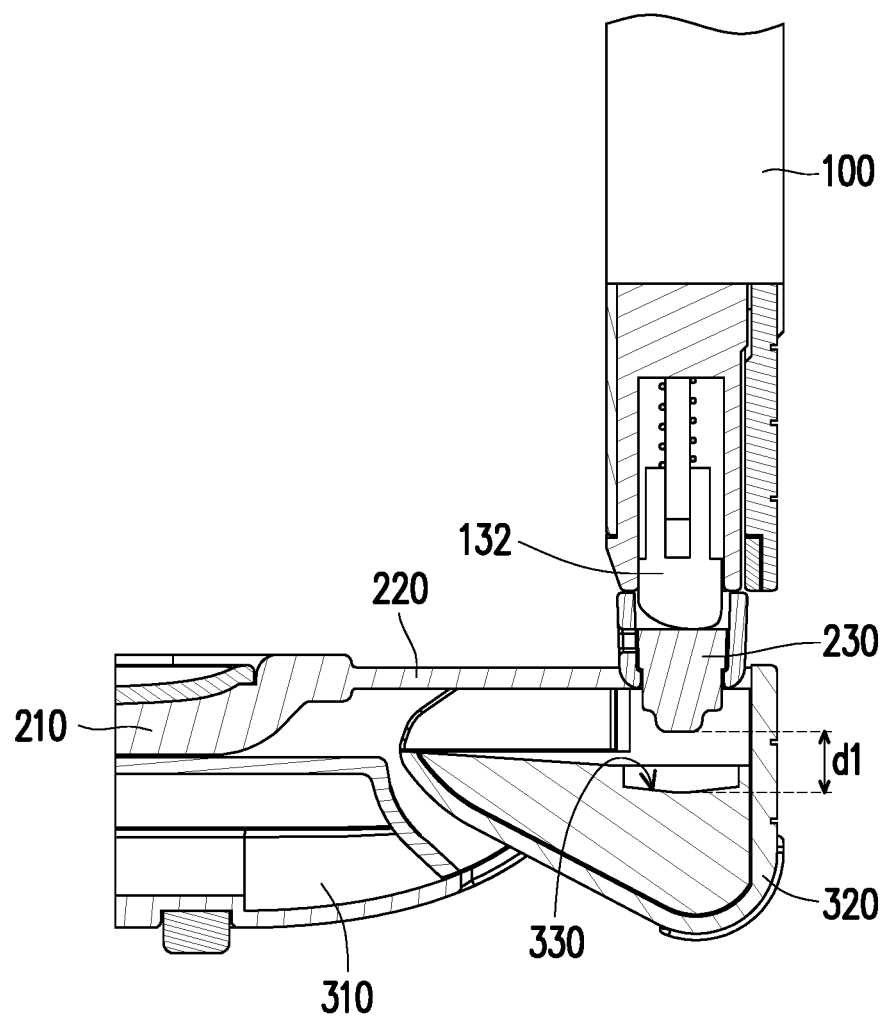

As shown in FIG. 3C, FIG. 4 and FIG. 6D, the third device 300 further includes a second depression 330 located at the moving portion 320. In the second state, the second triggering member 132 and the flexible pad 230 covering the second triggering member 132 are accommodated in the second depression 330. Moreover, the second triggering member 132 and the flexible pad 230 keep a gap d1 from a bottom portion of the second depression 330. In this way, the second triggering member 132 is protected by the second depression 330 from the outside, and that the stand 131 of the electronic assembly 10 is maintained to be unfolded in the second state.

With reference to FIG. 1 again, the first device 100 and the third device 300 form a circuit through butting of the second electrical connector C2 and one of the fourth electrical connectors C4 in this embodiment. Further, the electronic assembly 10 further includes an electronic module which may be disposed in the first device 100, the second device 200, or the third device 300 and is electrically connected to the circuit. The electronic module is configured for releasing the electrical connection relationship between the first device 100 and the third device 300 before the first device 100 and the third device 300 are separated, so that electrical damages are prevented during structural separation. Further, the electronic module is an operating system of the first device 100, or the electronic module has a physical button disposed on the first device 100, the second device 200, or the third device 300. A button 240 disposed on the second device 200 is taken as an example herein. People having ordinary skill in the art may naturally think of other implementations such as an operating system without a physical button or a physical button being disposed on the first device 100 or on the third device 300 with reference to the button 240 and the foregoing description, so as to release the electrical connection between the first device 100 and the third device 300.

Figure 7:
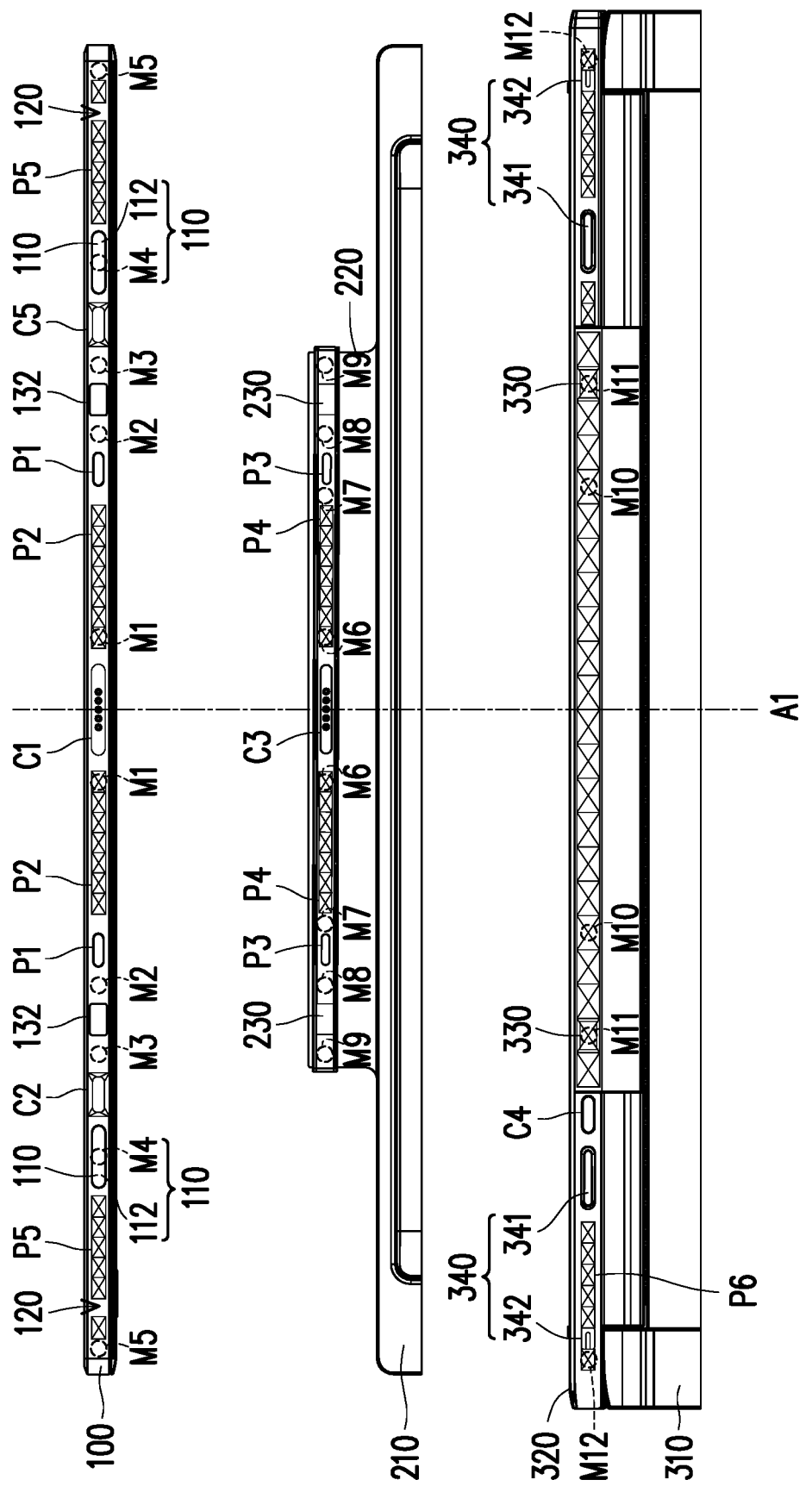
FIG. 7 and FIG. 8 are schematic views illustrating corresponding relationships of the devices according to different embodiments of the invention.
Figure 8:
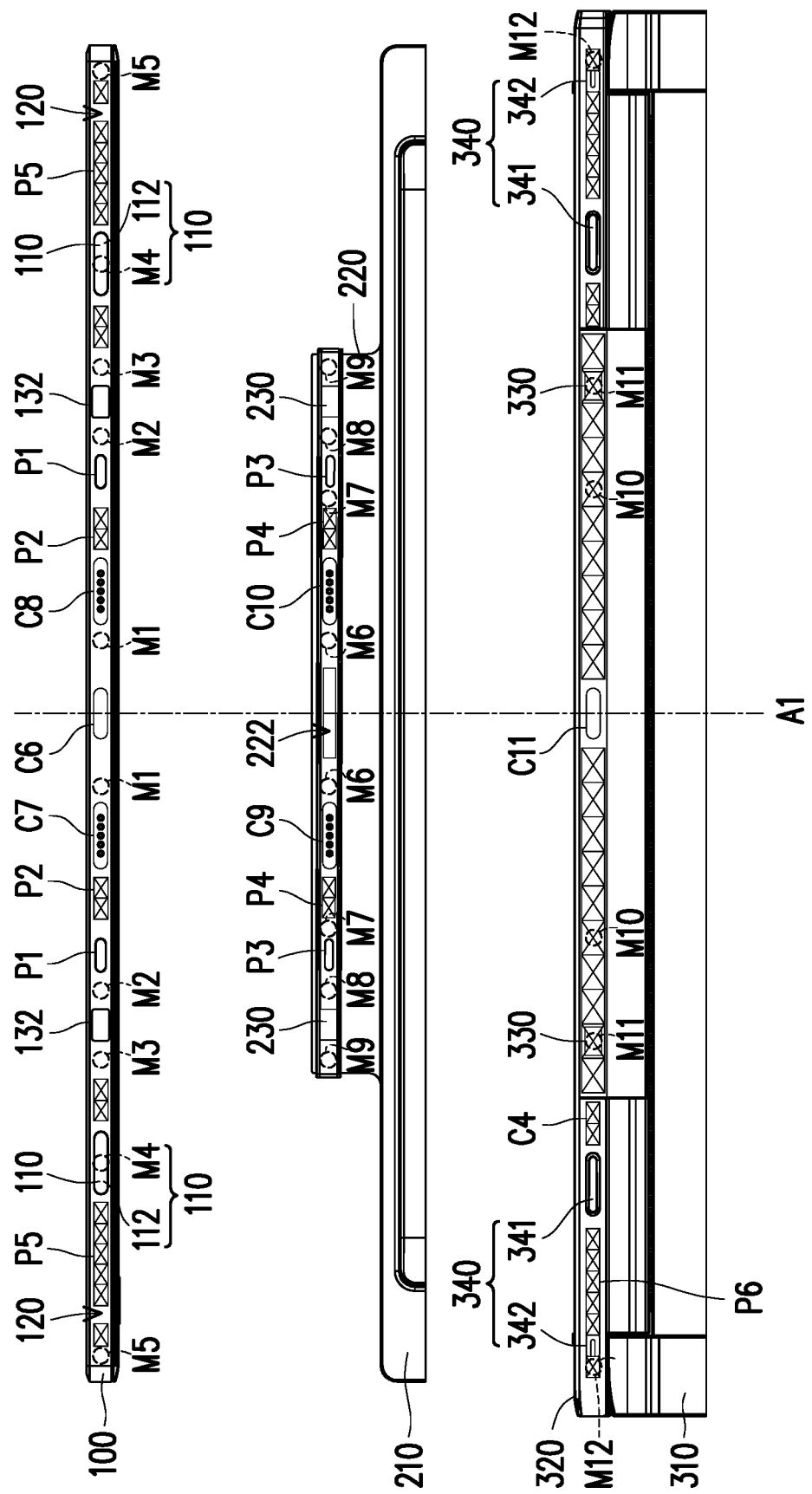

FIG. 7 and FIG. 8 are schematic views illustrating corresponding relationships of the devices according to different embodiments of the invention. With reference to FIG. 7 first, different from the foregoing embodiment, in the electronic assembly of this embodiment, the first device 100 has a pair of second electrical connectors C2 and C5, and the electrical connectors are both type C connectors as described above. In this case, when the first device 100 and the third device 300 are combined, an orientation problem is not required to be considered. That is, when the second electrical connector C2 of the first device 100 is connected to the fourth electrical connector C4 of the third device 300, as in the state shown by FIG. 1, a screen of the first device 100 faces the user (a side having the input module). In contrast, the user may also use the second electrical connector C5 instead to be butted to the fourth electrical connector C4, so that the screen of the first device 100 faces a direction opposite to the foregoing direction.

Nevertheless, any mean capable of achieving a positive-negative combination of the first device 100 and the third device 300 is not limited by the invention. In other embodiments that are not shown, a number of the fourth electrical connector C4 of the third device 300 may be changed to be a pair, and the pair of fourth electrical connectors C4 are also symmetrically disposed with respect to the central axis A1. In this way, the first device 100 can also be positively and negatively inserted in the third device 300.

With reference to FIG. 8, another implementation is provided to enable the first device 100 to be positively and negatively inserted. As shown in FIG. 8, the first device 100 has a pair of first electrical connectors C7 and C8 symmetrically disposed with respect to the central axis A1. The second device 200 also has a pair of third electrical connectors C9 and C10 symmetrically disposed with respect to the central axis A1 as well. Further, the first electrical connectors C7 and C8 are respectively butted to the third electrical connectors C9 and C10. In addition, the second electrical connector C6 and the fourth electrical connector C11 are located on the central axis A1, and the second electrical connector C6 penetrates an opening 222 of the second device 200 to be butted to the fourth electrical connector C11. In this way, as a type C connector can be positively and negatively inserted, the first electrical connectors and the second electrical connector can be disposed in a reversed manner. The positions of the electrical connectors disposed in the second device 200 and in the third device 300 are then accordingly changed, and that the first device 100 can be positively and negatively inserted in the third device 300.

In view of the foregoing, in the embodiments of the invention, the electronic assembly is constituted by the tablet PC and the flexible cover having the input module or is constituted by the tablet PC, the flexible cover having the input module, and the docking station. The first device, the second device, and the third device form structural and electrical connection relationships with each other through connection of the related positioning members, triggering members, magnetic members, and the like. Therefore, the different forms of the electronic assembly may be adjusted as required by the user, so that the electrical assembly may be operated more conveniently, and favorable performance is thus delivered as the forms may be changed and combined by the user according to demand.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic assembly, comprising:
    a first device, having at least one first positioning member, at least one first electrical connector, and at least one second electrical connector;
    a second device, having at least one second positioning member and at least one third electrical connector;
    a third device, having at least one fourth electrical connector; and
    a first triggering member, disposed in the third device, the first triggering member having a driven portion and a locking portion being opposite to each other,
    the first device being detachably assembled to and electrically connected to the second device when in a first state, wherein the at least one first positioning member and the at least one second positioning member are matched with each other, and the at least one first electrical connector and the at least one third electrical connector are butted to each other,
    the first device being detachably assembled to and electrically connected to the second device, and the first device being detachably assembled to and electrically connected to the third device when in a second state, wherein the at least one first positioning member and the at least one second positioning member are matched with each other, the at least one first electrical connector and the at least one third electrical connector are butted to each other, the at least one second electrical connector and the at least one fourth electrical connector are butted to each other, and the first device is correspondingly propped against and drives the driven portion submerged into the third device so as to drive the locking portion to protrude out of the third device and to be locked to a securing portion of the first device.

2. The electronic assembly as claimed in claim 1, wherein the first device further comprises at least one first magnetic member, the second device further comprises at least one second magnetic member, and the at least one first magnetic member and the at least one second magnetic member magnetically attract each other in the first state or in the second state.

3. The electronic assembly as claimed in claim 1, wherein only the driven portion or only the locking portion of the first triggering member protrudes out of the third device at a time.

4. The electronic assembly as claimed in claim 1, wherein the first device further comprises at least one fourth positioning member, the third device further comprises at least one third positioning member, and the at least one third positioning member and the at least one fourth positioning member are matched with each other and thus are positioned in the second state.

5. The electronic assembly as claimed in claim 4, wherein the first device has a plurality of fourth positioning members, the third device has a plurality of third positioning members, the driven portion is located at one of positions between the third positioning members, or the driven portion is one of the third positioning members, the first device drives the driven portion submerged into the third device through a triggering plane, and the triggering plane is located at one of positions between the fourth positioning members.

6. The electronic assembly as claimed in claim 4, wherein the at least one third positioning member and the at least one fourth positioning member feature a concave structure and a convex structure matched with each other.

7. The electronic assembly as claimed in claim 1, wherein the securing portion comprises a first depression and a third magnetic member disposed in the first depression, and the locking portion is a magnetic member, or the locking portion comprises a magnetic member so that the locking portion is locked to the first depression and magnetically attracts the third magnetic member in the second state.

8. The electronic assembly as claimed in claim 1, wherein the second device further comprises a fourth magnetic member, the third device further comprises at least one fifth magnetic member, and the fourth magnetic member magnetically attracts the at least one fifth magnetic member in the second state.

9. The electronic assembly as claimed in claim 8, wherein the first device has a plurality of first magnetic members, the second device has at least one second magnetic member, the third device has a plurality of fifth magnetic members, and one of the fifth magnetic members magnetically attracts the fourth magnetic member, another one of the fifth magnetic members magnetically attracts the at least one second magnetic member, and still another one of the fifth magnetic members magnetically attracts one of the first magnetic members in the second state.

10. The electronic assembly as claimed in claim 1, wherein the at least one first positioning member and the at least one second positioning member feature a concave structure and a convex structure matched with each other.

11. The electronic assembly as claimed in claim 1, wherein the first device has a plurality of first positioning members, the second device has a plurality of second positioning members, and the first positioning members and the second positioning members feature a concave structure and convex structure having different matching degrees.

12. The electronic assembly as claimed in claim 1, wherein the second device has a protruding portion, the second device has at least one second magnetic member, the at least one second positioning member, the at least one second magnetic member, and the at least one third electrical connector are located on the protruding portion, and the protruding portion is sandwiched between the first device and the third device in the second state, and the at least one second electrical connector, the at least one fourth electrical connector, the first triggering member, and the securing portion are located outside the protruding portion in the second state.

13. The electronic assembly as claimed in claim 1, wherein the first device further comprises a stand and a second triggering member, the stand is pivoted to a machine body of the first device to pivot and to open and close relative to the machine body, the second triggering member is movably disposed at the machine body to protrude from or submerge into the machine body, and the second triggering member is connected to the stand to drive the stand to pivot and open relative to the machine body when the second triggering member submerges into the machine body.

14. The electronic assembly as claimed in claim 13, wherein the second triggering member, the at least one first positioning member, the at least one first electrical connector, and the at least one second electrical connector are together located on a bottom surface of the machine body.

15. The electronic assembly as claimed in claim 13, wherein the second device further comprises a flexible pad so that the flexible pad covers an outer surface of the second triggering member in the first state, and an external force is adapted to be applied to the flexible pad to drive the second triggering member to submerge into the machine body.

16. The electronic assembly as claimed in claim 15, wherein the third device further comprises a second depression, the second triggering member and the flexible pad covering the second triggering member are accommodated in the second depression in the second state, and the second triggering member and the flexible pad keep a gap from a bottom portion of the second depression.

17. The electronic assembly as claimed in claim 1, further comprising an electronic module, disposed in the first device, the second device, or the third device, the first device and the third device forming a circuit through butting of the at least one second electrical connector and the at least one fourth electrical connector, the electronic module being electrically connected to the circuit, the electronic module being configured to release an electrical connection relationship between the first device and the third device.

18. The electronic assembly as claimed in claim 17, wherein the electronic module is an operating system of the first device, or the electronic module has a physical button disposed on the first device, the second device, or the third device.

19. The electronic assembly as claimed in claim 1, the first device and the third device sharing a central axis in the second state, the first device having a pair of second electrical connectors, or the third device having a pair of fourth electrical connectors, the pair of second electrical connectors being symmetrically disposed with respect to the central axis, or the pair of fourth electrical connectors being symmetrically disposed with respect to the central axis.

20. The electronic assembly as claimed in claim 1, the first device, the second device, and the third device sharing a central axis in the second state, the first device having a pair of first electrical connectors symmetrically disposed with respect to the central axis, the second device having a pair of third electrical connectors symmetrically disposed with respect to the central axis, the pair of first electrical connectors and the pair of third electrical connectors being butted to each other, the at least one second electrical connector and the at least one fourth electrical connector being located at the central axis, and the at least one second electrical connector penetrating the second device and being abutted to the at least one fourth electrical connector.

21. The electronic assembly as claimed in claim 1, wherein the first device is a tablet PC, the second device is a flexible cover having an input module, and the third device is a docking station.

* * * * *